Dec. 3, 1968 J. KRAUSS ETAL Re. 26,496

MEAT CASING

Original Filed Aug. 17, 1964

INVENTORS
JOHN KRAUSS
RICHARD J. BARBU
BY
Brock & Brock
ATTORNEYS

United States Patent Office

Re. 26,496
Reissued Dec. 3, 1968

26,496
MEAT CASING

John Krauss, Jamaica Estates, and Richard J. Barbu, Lindenhurst, N.Y., assignors to Markbar Corporation, Garden City, N.Y., a corporation of New York Original No. 3,248,905, dated May 3, 1966, Ser. No. 389,837, Aug. 17, 1964. Application for reissue Nov. 21, 1966, Ser. No. 615,871
1 Claim. (Cl. 66—193)

Matter enclosed in heavy brackets [ ] appears in the original patent but forms no part of this reissue specification; matter printed in italics indicates the additions made by reissue.

*ABSTRACT OF THE DISCLOSURE*

*A fabric consisting of two panels having adjoining selvage edges, each consisting of a warp-wise strand of knitted chain loops. Each panel has a plurality of parallel lines of warp-wise, knitted chain loops providing courses for an elastic cord, the warp portions of which form bites which combine with the selvage edge chain loops, as knitted components thereof, to join the panels together. The bites of elastic cord from each panel alternate along the strand of chain loops constituting the joined selvage edges of the fabric. The elastic cord is covered by two layers of thread. Each layer is composed of right and left hand filaments, adjacent coils of the outer layer threads being in continuous contact when the cord is in relaxed state.*

This invention relates to receptacles and, in particular, to casings for food products which are introduced into the oven with the food product contained therewithin for roasting purposes.

There are some forms and cuts of meat products which cannot be roasted unless they are held tightly compacted during the cooking process. Otherwise, it has been found, the meat tends to crumble and fall apart while roasting and emerges from the oven in a form which is unsightly in appearance and difficult to serve. Hitherto, the solution to this problem has been to encase the meat in a netted receptacle composed in part of elastic cords that are snugly covered by a single covering made from, for example, cotton or cotton and nylon thread. The special problem that such a container raises involves the use of elastic and its tendency under heat to flake off into the meat while the meat is in the roast. It would therefore seem desirable to design the netted material to prevent flaking of the elastic in the roasting process.

[To this end the invention contemplates a meat container adapted to assume a tubular conformation and made in netted form of elastic and non-elastic material which will be safe to use in roasting the meat contained therewithin.]

*The casing is made principally by knitting in a warp-knitting machine of the single needle bed type longitudinal strands comprising stitches of knitted loops. The elastic cords are laced into the stitches in sinuous fashion, the strands and cords thereby forming a fabric in several panels. The free edges of the outer panels are united, as by hand sewing, to form a tubular casing which is employed to encompass in a compact manner the meat as it is being processed.*

One object of the invention is therefore, to provide a netted casing for meat being cooked which is safe to use and economical to manufacture.

Other objects and advantages may be appreciated on reading the description below of one embodiment of the invention which is taken in conjunction with the accompanying drawings, in which.

Figure 2:
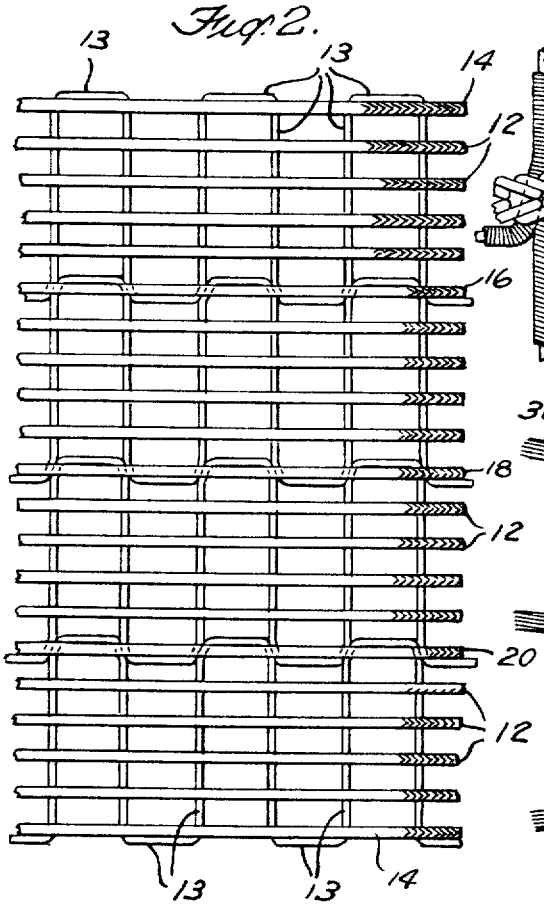
FIGURE 2 is a fragmentary enlarged view showing the details of the construction of the casing in development form.
Figure 3:
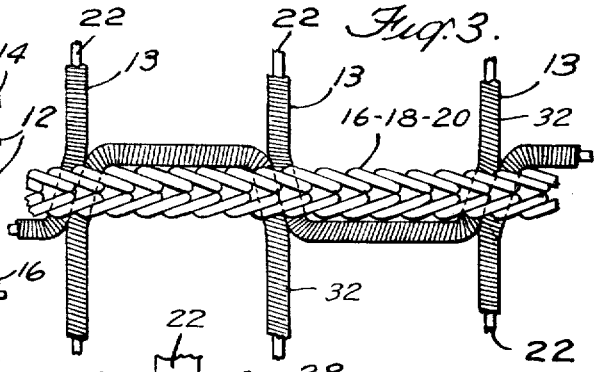
FIGURE 3 is a detail illustrating the means of connecting the longitudinal and circumferential strands on an enlarged scale.

Referring to the drawings, the meat receptacle 10 having front and rear faces is netted in form and can be fabricated exclusively by knitting. Its longitudinal strands 12 are composed of knitted chains [of ways stitches] *of single loops* which are non-elastic. As shown in FIGURE 2 the circumferential cords 13 are composed of four independent strands, each containing a rubber core, which extend the entire length of the casing being looped respectively between flat seam 14 and longitudinal strand 16, the latter and longitudinal strand 18, the longitudinal strand 18 and longitudinal strand 20, and strand 20 and seam 14. *As shown in FIG. 3, the longitudinal strands 16, 18 and 20 are in the form of knitted chain stitches defining a warp-wise row of loops, each row constituting a selvage edge for contiguous panel fabrics. The selvage edges are joined together by means of the bites alternately disposed on each side of the chain stitches and provided by the weft cords 13 which extend through the chain stitches 16, 18 and 20, and which are reversely turned at opposing selvage edges.*

The circumferential cords 13 have an elasticized rubber core 22 which shrinks as it is heated. Each core is enveloped by an inner covering layer 24 and an outer covering layer 26. The inner covering layer 24 consists of a single filament, left hand wound thread 28 and a single filament right hand wound thread 30. The outer covering layer 26 comprises a left hand thread 32 composed of four filaments and a right hand thread 34 also composed of four filaments. *The thread for the covering layer is preferably cotton or cotton and nylon.*

*Each panel defined by the seam 14 and the strands 16, 18 and 20 including warp-wise strands 12 are knitted together by means of the weft cords 13. The outer selvage edges of the panels may then be brought together and stitched to form the flat seam 14.*

Figure 1:
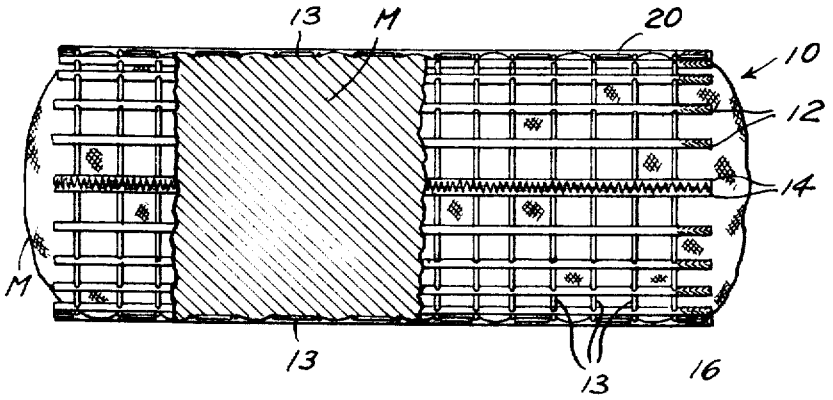
FIGURE 1 is a side elevation showing the meat product within the netted casing with a portion in section.
Figure 4:
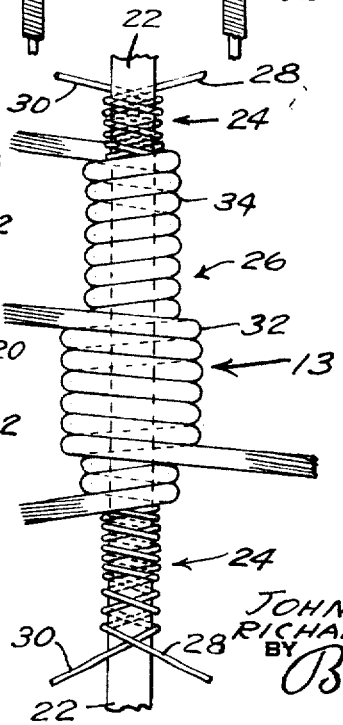
FIGURE 4 is an enlarged detail view showing the construction of the elastic strands.

*When the receptacle is stuffed with meat M, it assumes the stretched configuration shown in FIGURE 1.* [When the receptacle is stuffed with meat M, and stretched as shown in FIGURE 1, it may be appreciated that the threads of each covering in the circumferential cords being wound in opposite turns tend to move together and prevent exposure of the elastic core which tends to contract on exposure to heat.] *In FIG. 4, it is seen that adjacent coils of each of the oppositely wound threads 32 and 34 of the outer covering layer 26 are in continuous contact with one another, the outer layer being thus closely wound, while adjacent coils of the threads 28 and 30 are out of contact with one another, the inner covering layer being thus in spaced apart, adjacent coil thread formation wound.*

Various modifications to the invention may be effected by persons skilled in the art without departing from the scope and principle thereof as defined in the appended claims.

We claim:

1. A food receptacle for containing food being cooked comprising a netted fabric adapted to assume a tubular shape, said fabric being composed of circumferential and longitudinal strands, one of said strands having an elastic core and a double layer of covering therefor which affords continuous and uninterrupted protection for said core under stretch conditions, each of said covering layers being composed of right and left hand wound threads with adjacent coils of thread in [each] *the outer covering* layer in continuous contact with each other, *the outer and inner threads of the inner covering layer being wound with adjacent coils thereof out of contact with each other,* the outer covering layer threads each comprising a plurality of filaments.

[2. A receptacle as defined in claim 1 in which each of the threads in the outer layer is composed of a plurality of filaments.]

References Cited

The following references, cited by the Examiner, are of record in the patented file of this patent or the original patent.

UNITED STATES PATENTS

| | | | |
|---|---|---|---|
| 1,679,822 | 8/1928 | Hall | 57—152 |
| 1,853,666 | 4/1932 | Crimmins | 57—152 X |
| 1,864,345 | 6/1932 | Fox | 57—152 |
| 2,587,117 | 2/1952 | Clay | 66—193 X |
| 2,706,898 | 4/1955 | Gross et al. | 66—193 |
| 2,852,834 | 9/1958 | Engelhard | 66—202 X |
| 3,178,910 | 4/1965 | Hammerle. | |
| 3,306,081 | 2/1967 | Miles et al. | 66—202 X |
| 1,749,776 | 3/1930 | O'Lena. | |
| 1,828,668 | 10/1931 | Kern | 99—174 |
| 2,518,407 | 8/1950 | Weinberg | 66—193 |

FOREIGN PATENTS

| | | |
|---|---|---|
| 480,422 | 8/1929 | Germany. |

WM. CARTER REYNOLDS, *Primary Examiner.*